(12) United States Patent
Engle

(10) Patent No.: US 9,290,323 B2
(45) Date of Patent: Mar. 22, 2016

(54) RECIRCULATING CONTINUOUS STORAGE APPARATUS

(75) Inventor: Raphael Abraham Engle, Auckland (NZ)

(73) Assignee: REC Equipment Limited, Auckland (NZ)

( * ) Notice: Subject to any disclaimer, the term of this patent is extended or adjusted under 35 U.S.C. 154(b) by 41 days.

(21) Appl. No.: 13/825,489

(22) PCT Filed: Mar. 15, 2012

(86) PCT No.: PCT/NZ2012/000038
§ 371 (c)(1),
(2), (4) Date: Oct. 9, 2013

(87) PCT Pub. No.: WO2012/125047
PCT Pub. Date: Sep. 20, 2012

(65) Prior Publication Data
US 2014/0027242 A1    Jan. 30, 2014

(30) Foreign Application Priority Data

Mar. 15, 2011 (NZ) ........................................ 591732

(51) Int. Cl.

| | |
|---|---|
| *B65G 1/133* | (2006.01) |
| *B65G 1/127* | (2006.01) |
| *B65G 47/57* | (2006.01) |
| *B65G 65/02* | (2006.01) |
| *A23L 3/04* | (2006.01) |
| *A23L 3/36* | (2006.01) |
| *A23B 4/005* | (2006.01) |
| *A23B 4/06* | (2006.01) |
| *B65G 47/51* | (2006.01) |

(52) U.S. Cl.
CPC .............. *B65G 1/133* (2013.01); *A23B 4/0056* (2013.01); *A23B 4/064* (2013.01); *A23L 3/04* (2013.01); *A23L 3/362* (2013.01); *B65G 1/127* (2013.01); *B65G 47/5109* (2013.01); *B65G 47/57* (2013.01); *B65G 65/02* (2013.01)

(58) Field of Classification Search
None
See application file for complete search history.

(56) References Cited

U.S. PATENT DOCUMENTS

| | | | |
|---|---|---|---|
| 4,108,056 A | 8/1978 | Van Elten et al. | |
| 5,588,790 A * | 12/1996 | Lichti | B65G 1/133 198/333 |
| 6,233,841 B1 * | 5/2001 | Beach | A23L 3/54 34/203 |
| 7,210,889 B2 | 5/2007 | McFarland | |
| 7,261,509 B2 | 8/2007 | Freudelsperger | |
| 2008/0181753 A1 | 7/2008 | Bastian et al. | |

FOREIGN PATENT DOCUMENTS

WO    WO 96/27299    9/1996

OTHER PUBLICATIONS

International Search Report, PCT/NZ2012/000038, Jul. 9, 2012.

* cited by examiner

*Primary Examiner* — Kavel Singh
(74) *Attorney, Agent, or Firm* — Young & Thompson

(57) ABSTRACT

A continuous storage apparatus holds carriers each having many vertical shelves to be continuously loaded and unloaded by pushers at adjacent positions. The conveyor order of arrival of items is maintained on departure. Shelves hold items to be frozen or cooked during storage by a forward or backward (countercurrent) flow of recirculating cold or hot air within the tunnels of the machine. Carrier motion is provided by lifting and lowering conveyor chains at both ends of the tunnels and by shunting the carriers, supported by wheels or skids on rails along the tunnels, when pushed by an actuator.

15 Claims, 7 Drawing Sheets

RECIRCULATING CONTINUOUS STORAGE APPARATUS

FIELD

Figure 1:
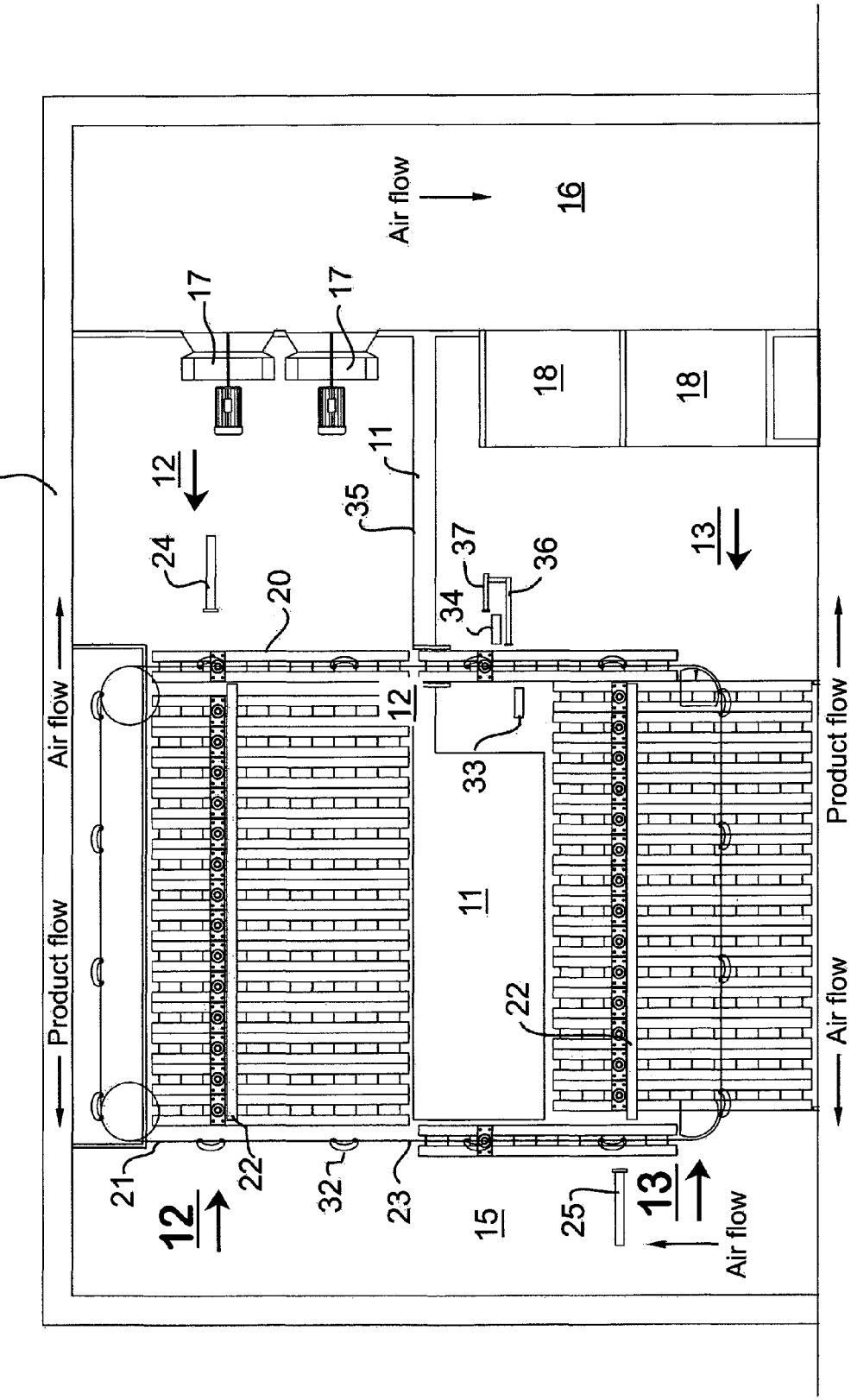

This invention relates to apparatus for receiving items from a continuous conveyer transport medium; and in a preferred version the apparatus includes means for forcibly changing the temperature of those products during internal storage before returning items to a conveyor. More particularly the apparatus uses a temperature controlled airflow for freezing or cooking items such as food products including meat or poultry packages and ready meals, and is a buffer to match a continuous flow of product movement to an intermittent flow.

BACKGROUND

Several publications that describe apparatus to match a continuous incoming flow of product (or item) movement, such as on a first conveyor to an intermittently demanded outgoing flow of items are known; for instance Koop in U.S. Pat. No. 5,636,722. Such storage machines place products on shelves in an array of shelved gondolas and retrieve the products after an internal journey.

Koop described a vertically movable end of a supply conveyor, for which the arrival of items is perpendicular to the length of gondola shelves. Koop overcame the shelf height spacing discontinuity that arises at the end of each gondola by physically moving the delivering end of the supply conveyor up and down during delivery. That motion simulated a constant speed of item acceptance. The approach direction also requires a rather small deflection roller.

Several machines are known for moderating the temperature of products such as food products in a production-line, whether to chill or freeze them with a cooling system or to sterilise, bake or dry them with a heating system. The "product" might be an individually packaged meal to be converted into a frozen form, or a poultry carcass, for example. Such systems generally include a racking system by which racked arrays of products are held or moved for a predetermined period in a chilling or warming air stream. One class of system is a "TCS" or "Temperature Change and Sorting" system. See for example Engle PCT/NZ2006/000175, and Colombo U.S. Pat. No. 5,473,978. Heating or cooling can be collectively regarded as "forced heat transfer into or out of an item"; often through an enclosure such as packaging. Forcing a temperature change may involve changing the state of the matter within each package, such as freezing or boiling or cooking. Those publications describe a means to bring together and hold items under hot or cold conditions for a period of time. 30 minutes. Two or three-dimensional packing on a temporary conveyor is preferable. The desired apparatus can be regarded as a "timed storage including effective cooling or heating" component of a production chain.

In the cited publications the order of the delivered items is usually not preserved between arrival and departure. Although that defect may not matter in some instances, it is preferable that the order remains the same. None of the cited publications describe an efficient way to transfer heat into or out of the items, yet greater efficiency will provide a saving in energy costs and more certainty that every item was properly processed.

Further problems arise as the required throughput increases. The challenge is to provide a simple and reliable system which remains capable of fast and of course fully automated loading and/or unloading from the racking system, preferably providing the required retention time in one pass through the system, and incorporating an efficient temperature changing process. Since the racking system and associated mechanism is typically located within a space that is difficult if not impossible of access to a person, it should be fault-proof or at least highly fault-tolerant.

In prior art apparatus the product was collated or grouped prior to loading, then loaded as a "slug" or group of product items moved as an in-contact group, and singulated, or packed separately, in order to handle higher production rates while operating within acceptable and safe machine speeds. While this was acceptable for larger cartons and speeds of up to 40 units a minute, this was possible only with a TCS (temperature continuous storage) type machine having large shelves. Such prior art apparatus requires that the incoming product be halted from time to time because the internal racking and storage system worked on a batch basis.

Raising the working speed presents a number of problems, including internally causing a circulation of slugs of items by pushing each delicate and dimensionally unstable product against an adjacent product in order to cause movement, which makes motion of the slug inconsistent and prone to product damage. The product transfers need to be very precise, and the time required to accumulate slugs within the shelf cycle time can be an issue, such that multiple in-feed lines may be required in order to handle the accumulation requirements. Singulation after the freezing stage is an expensive exercise. In general the controls required for such systems are very complex.

It is desirable to provide a simple yet effective apparatus that can be inserted into a conveyor system and used for temporary storage of items taken from the conveyor system, meanwhile optionally subjecting the items to heating or cooling before the items are returned to the conveyor system.

OBJECT

It is an object of this invention to provide improved continuous storage and temperature changing apparatus, and methods of operation of same, compatible with high speed production lines that are continuously, or substantially continuously, operated and with downstream automation, or at least to provide the public with a useful choice.

STATEMENT OF INVENTION

In a first broad aspect, the invention provides a recirculating storage apparatus having an enclosed housing 10, wherein one or more items received from a first or incoming item transport means or conveyor 34 are held in a internal transport conveyor having a closed loop configuration providing for a retention time within a controlled environment, and then are transferred to a second or outgoing item transport means or conveyor 33; wherein the apparatus includes a plurality of internal recirculating carriers 20 occupying the internal transport conveyor 21; each carrier having a vertical series of horizontal shelves 26, 26A each having a length, and wherein the input conveyor 34 has a direction of movement aligned along the length of the shelves so that each shelf can be loaded at a loading station from a series of transported items by one pushing motion of an actuator 37 having a pushing surface nearly as wide as the length of any shelf; wherein the output conveyor 33 has a direction of movement aligned along the length of the shelves so that each shelf can be unloaded on to conveyor 33 at an unloading station by one pushing motion of an actuator 36; and wherein the loading and the unloading stations are adjacent, and wherein the closed loop configuration of the internal transport conveyor includes a first vertical transfer means 21 traversing the loading station and the unloading station at which the shelves of the carrier are unloaded and re-loaded, a first carrier actuator 24 capable when activated of pushing an adjacent, loaded carrier sideways into and capable of pushing a stack of like carriers through a first substantially horizontal tunnel 12, then a second vertical transfer means 21, then a second carrier actuator 25 capable when activated of pushing an adjacent carrier sideways into, and capable of pushing a stack of like carriers through a second substantially horizontal tunnel 13 and back to the first vertical transfer means 21 thereby causing the stack of carriers to traverse the tunnels at a controlled average velocity, thereby controlling the retention time.

In a first related aspect the invention provides apparatus as previously described in this section, wherein each internal recirculating carrier 20A has a width and a height and a consistent shelf height pitch which pitch is maintained between a first carrier and a second adjacent carrier vertically above when both carriers are connected to a vertical transfer means, thereby permitting uninterrupted loading of the internal recirculating carriers 20A from the incoming conveyor 34.

Preferably the first vertical transfer means and the second vertical transfer means comprise at least one pair of endless chains each driven by motive power and each chain being provided with peg engagement means capable of reversibly engaging with one peg on each end of the upper supporting beam of the carrier.

In a subsidiary aspect the invention provides apparatus as previously described in this section, wherein the width and height of any one carrier is less than a width and a height of each tunnel, and wherein recirculated air having an actively controlled temperature is forced to repeatedly circulate through either: the second tunnel and then the first tunnel in a direction opposite to that of movement of the carriers, or the first and then the second tunnel in the same direction as the carriers thereby optimising contact of items on shelves of carrier with the air.

Preferably the recirculated air is actively controlled in order to cause a change of state of the items during the retention time, the change being selected from a range including sterilising, cooking, chilling and freezing.

In a further subsidiary aspect the predetermined temperature is selected from a range of between −50 deg C. and +120 deg C. by either refrigeration means or by heating mean In an alternative aspect the invention provides apparatus as previously described in this section, wherein the apparatus includes more than one separate sets of first and second horizontal tunnels and more than one carrier recirculation paths 22a with 22a(r) and 22b with 22b(r) within the housing 10 of the apparatus.

Optionally the separate defined paths are of different lengths thereby providing different retention times.

Alternatively the separate recirculation paths are when in use operated at different controlled velocities, thereby providing different retention times.

In a supporting aspect the invention provides apparatus as previously described in this section, wherein air control means 40a, 40b, 40c are provided in order to selectively divert the flow of air into either or both recirculation paths, thereby providing control over temperature change within the items.

Optionally also, the first and second conveyors 33, 34 are the same conveyor.

In a further related aspect the invention provides apparatus as previously described in this section, wherein said first and second extendable pushing beams 36, 37 are extended and retracted at the same time and the second conveyor 33 is located on an opposite side of the carrier and at a lower height relative to the first conveyor 34 that is equal to one or more vertical shelf spacings of the carrier 20, so that when in use one extension of both pushing beams 36, 37 causes the lower, loaded shelf to be cleared of items after storage for a retention time to the second conveyor, and causes the upper, unloaded shelf to be loaded with items to be stored from the first conveyor.

PREFERRED EMBODIMENT

The description of the invention to be provided herein is given purely by way of example and is not to be taken in any way as limiting the scope or extent of the invention. In particular, please note that a reference to a desired temperature, size or rate of operation is given by way of example only.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or any other country.

DRAWINGS

FIG. 1: shows a first embodiment of the racking system of this invention, in side view.

Figure 2:
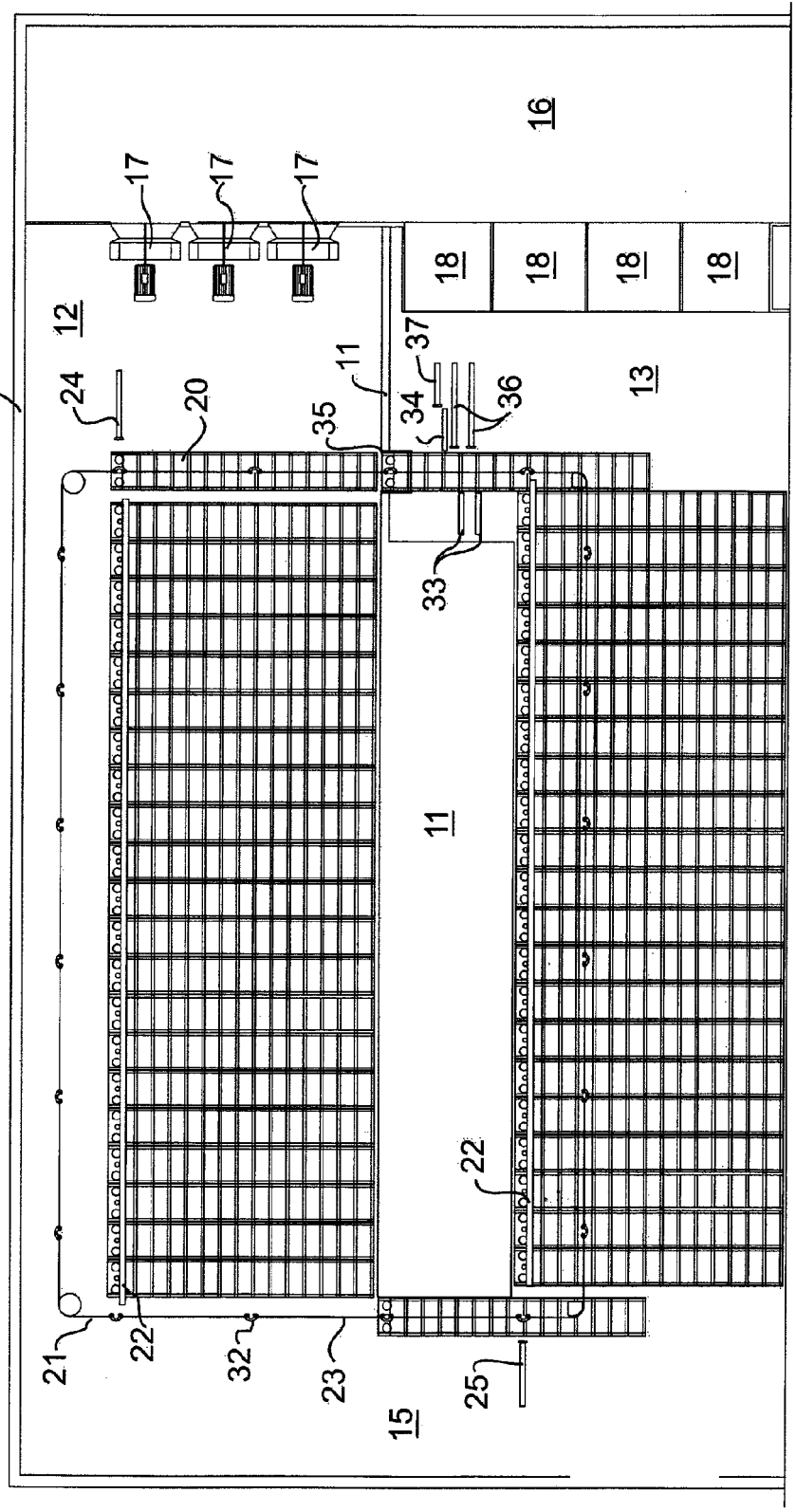

FIG. 2: shows a second, scaled-up version of the racking system of this invention in side view.

Figure 3:
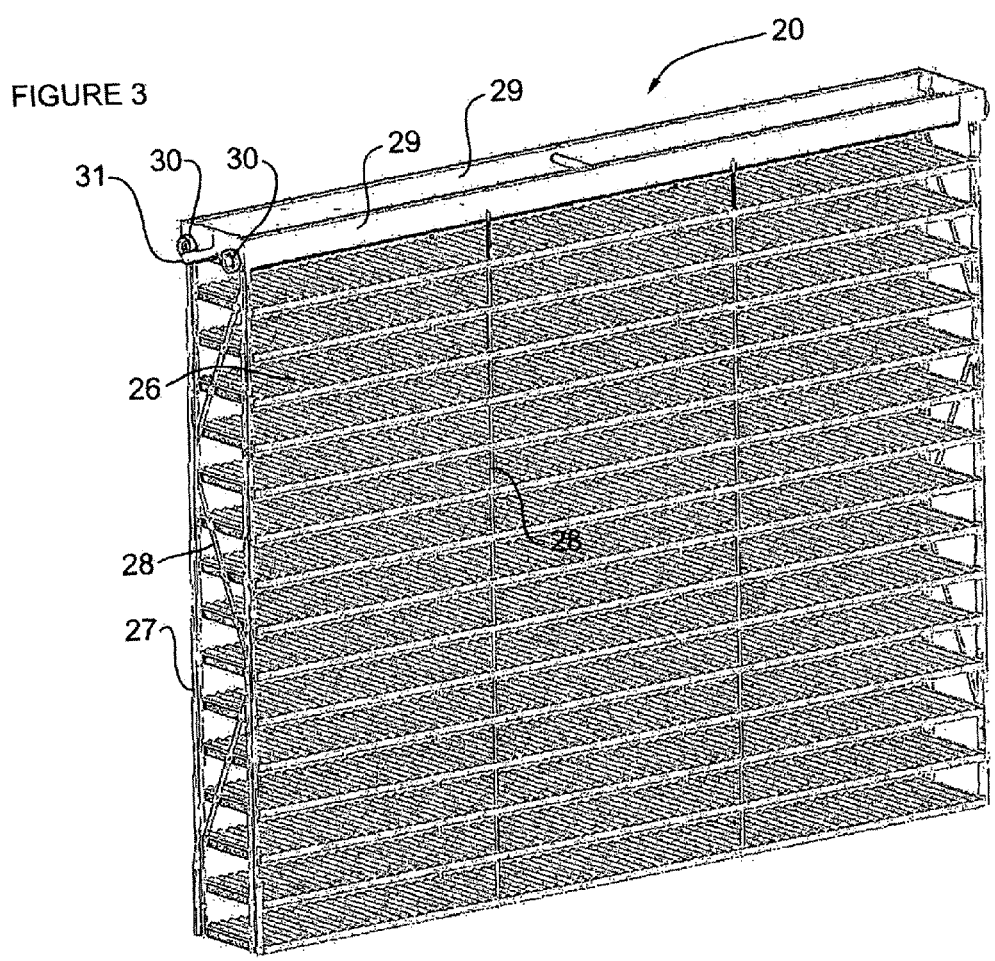

FIG. 3: shows an individual carrier as used in the system of FIG. 2 in perspective view.

Figure 3A:
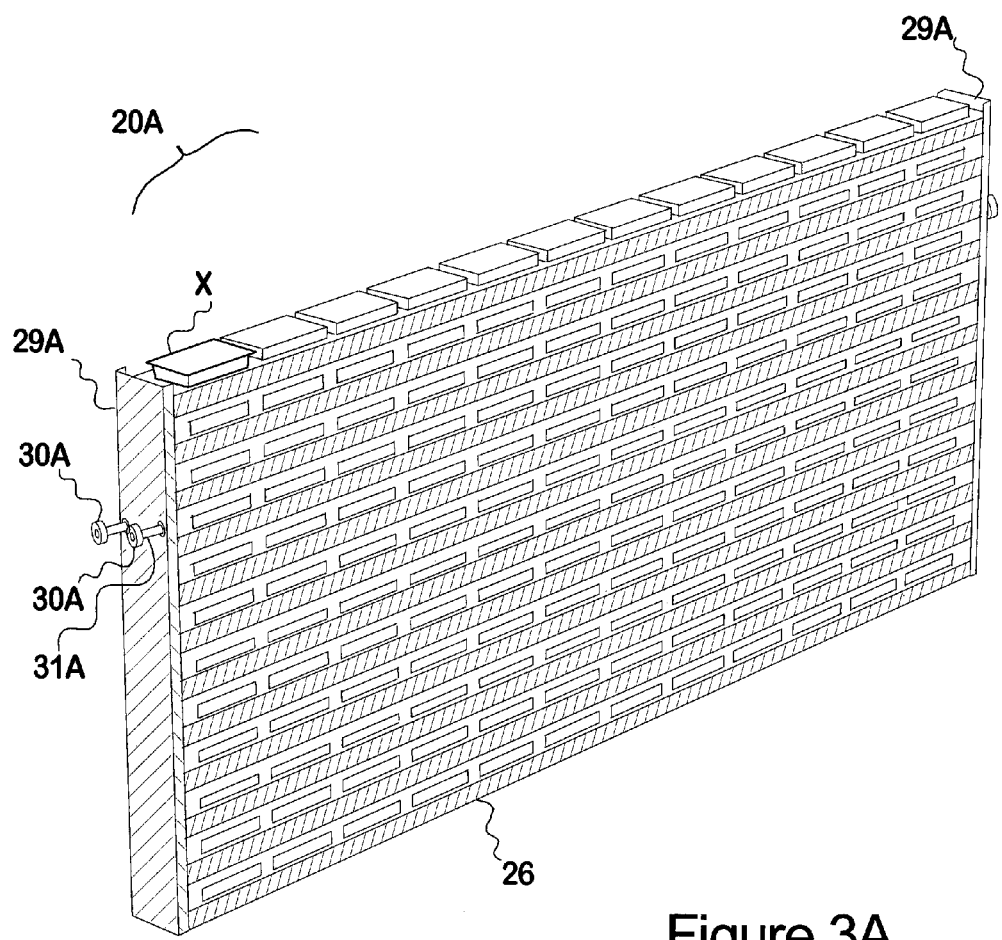

FIG. 3A: shows an improved version of a carrier, in perspective view.

Figure 4:
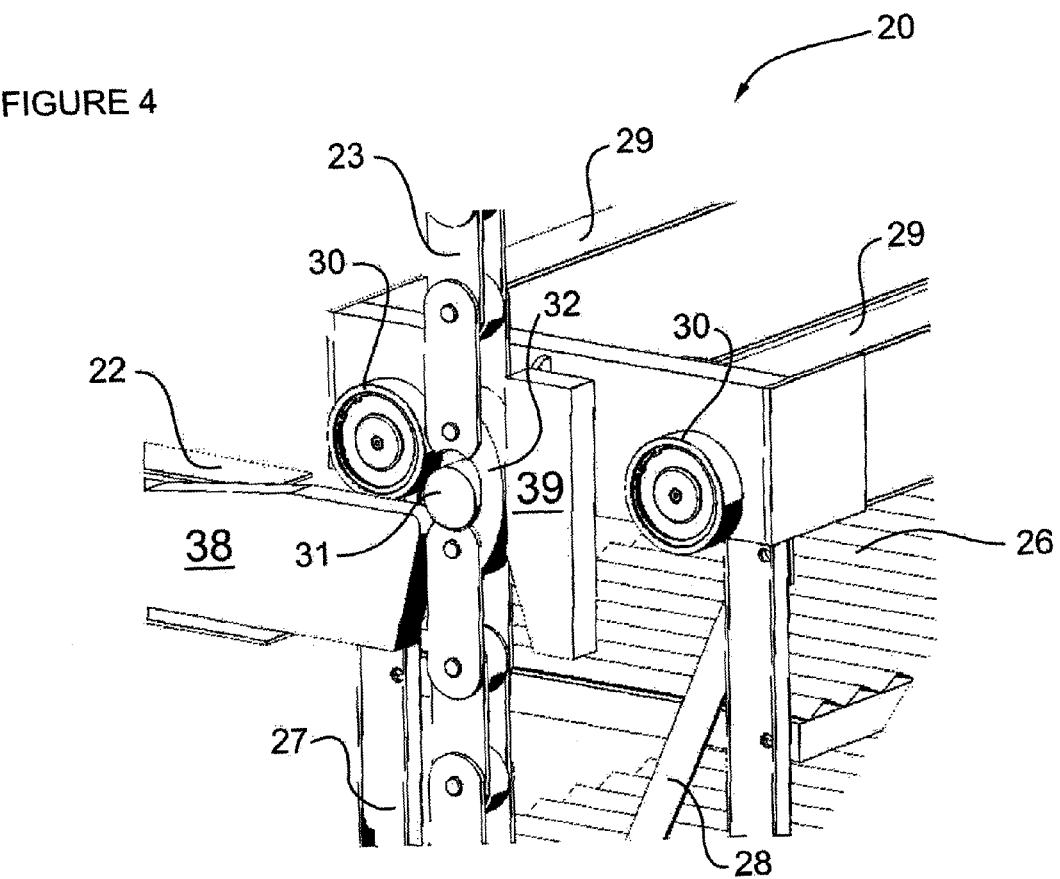

FIG. 4: shows detail of the bearing and detent arrangement of the carrier of FIG. 3 in perspective view.

Figure 5:
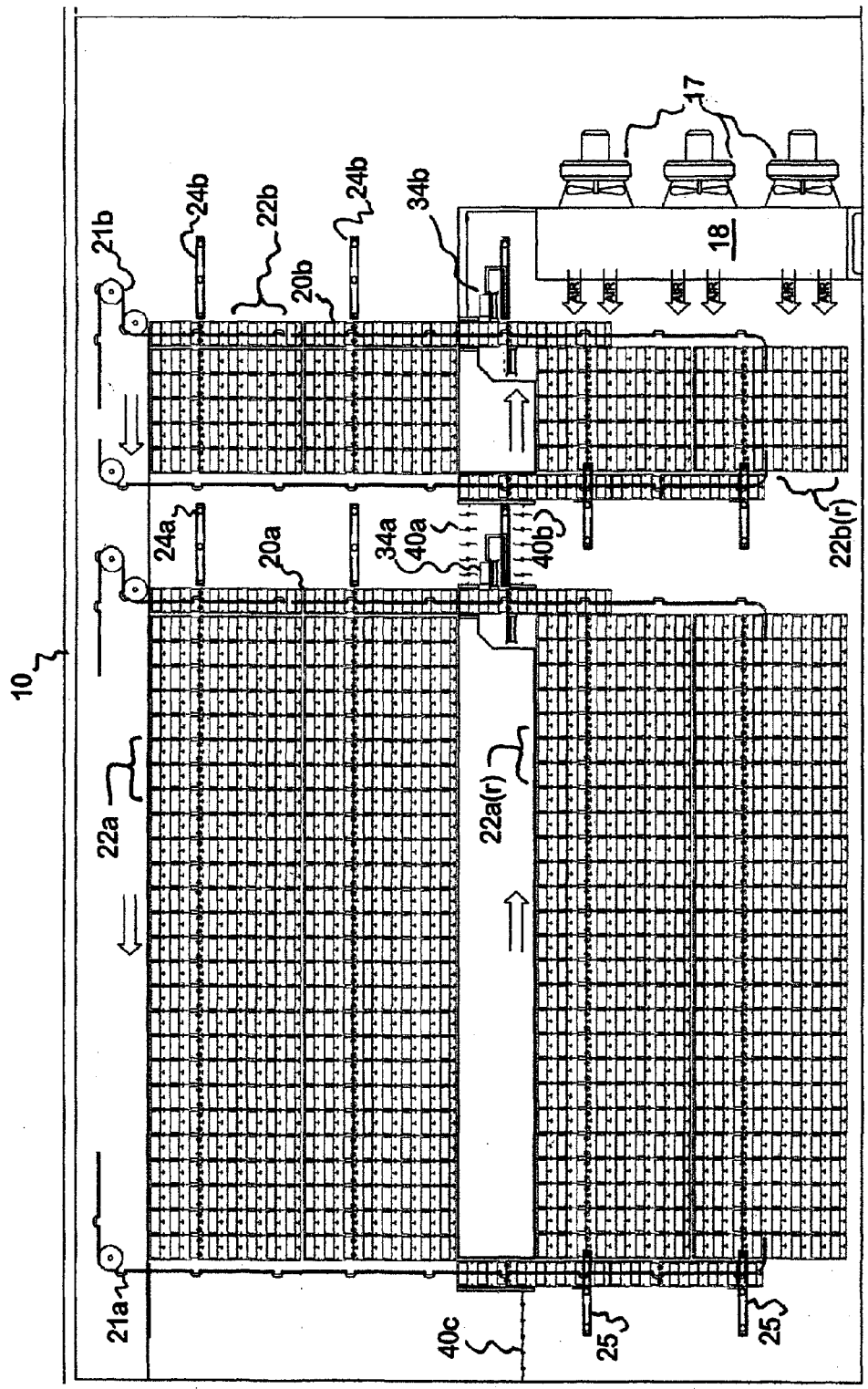

FIG. 5: shows a third, dual racking system according to this invention in side view.

Figure 6A:
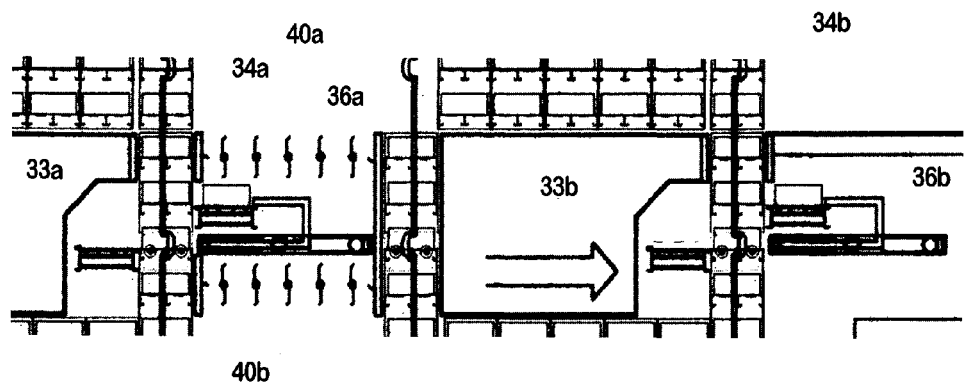
Figure 6B:
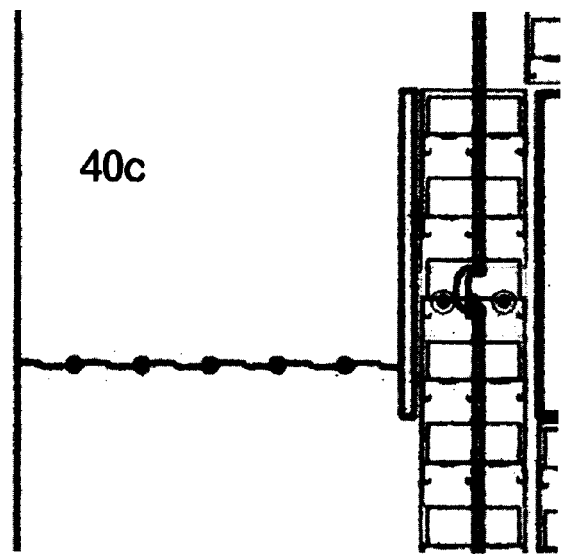

FIGS. 6: as 6a and 6b, shows details of an air flow control means from FIG. 5.

EXAMPLE 1

As shown in FIG. 1, a basic preferred embodiment of the apparatus comprises a racking system inside a freezing chamber 10 surrounded by a thermally insulating housing, and means for actively cooling and recirculating air are included. Note that "freezing" is a term introduced in relation to a temperature-lowering example; and a temperature-raising option is also provided for by the present invention. Thermal insulation might not be a prerequisite in all cases, although for all but simple storage, it is useful.

The particular examples shown here relate to apparatus for use in processing "ready meals" for which the end-product comprises individually packaged prepared and frozen meals. The system is equally applicable to any manufacturing process where the individual units can be placed in packages or containers of consistent size. In a ready meals application an example package size is 200×150×50 mm high, with a weight of 650 g per pack and an arrival or line speed of perhaps 40 packs per minute although much greater rates are often used. To freeze such a product, the retention time for each product in the freezing chamber might be 3 hours, depending on a number of factors such as the coldness and local velocity of the circulating air, and insulative properties of the containers and of the meals themselves. Preferably, an adequate safety margin is included in any specified retention time, so that the heating or the cooling process is reliably completed, since the material to be processed may undergo a state change such as freezing, and may be thermally insulated by packaging.

The capacity of the system is preferably sufficient to hold a number of products at least equal to the rate of the line speed multiplied by the required retention time, so that in use products can be moved continuously into, through and out of the chamber 10 at line speed. Please note that in FIG. 1 the upper set of labels "Product flow" and "Air flow" are superimposed on a part of the chamber 10 that is in practice likely to be packed with thermal insulation.

See FIG. 1 and succeeding illustrations. Regarding terms like "up" and "down" as used in this specification and the claims; this Example makes positive use of gravity such as in the suspension of product carriers each from an upper end and for the retention of product upon shelves. It would be possible (though less convenient) to create an apparatus embodying the same concepts in which gravity was disregarded and in that case terms like "up" and "down" would be altered. The freezing chamber 10 comprises a two-level chamber with a central horizontal baffle or floor 11 dividing it into an upper tunnel 12 and lower tunnel 13. At both ends the tunnels 12 and 13 are connected by vertical shafts 15 and 16, and fans 17 are used to drive a continuous air current down the shaft 16 at one end, through evaporators (or heaters) 18 by means of which the air is chilled (or heated), along the lower tunnel 13, up the shaft 15 at the other end of the chamber, and back along the upper tunnel 12 to return to the fans 17. Recirculation of air in a countercurrent direction (here, clockwise) to the direction taken by the products (here, anticlockwise) as described aids the efficiency of the invention. In some instances, countercurrent flow may not be a requirement. Preferably, the actual air temperature is regulated so that the cost of refrigeration is minimised. In this arrangement substantially all the air flow created by the fans passes through the length of both tunnels in sequence and in counter-current direction, opposite to that of the carriers. (Prior art freezers are known in which the air passes through both tunnels at the same time, or sideways across tunnels). Both the inflow conveyer 34 and the outflow conveyor 33 are likely to be belt conveyers which are part of an existing factory and which, according to this invention, transport materials in a plane perpendicular to that of the drawing in order to carry products into and then out of the apparatus. In other words the preferred direction of transport is parallel to the length of the shelves, facilitating loading and unloading that appears to be continuous in that the incoming conveyor may operate at a steady rate. This orientation also facilitates maintaining the sequence of items even though they have been stored. In some installations, it may be that conveyors 33 and 34 are the same conveyor.

Items to be frozen are held on a series of carriers 20 or 20A which rotate around a racking system. Incoming items are received, shelf by shelf, on a carrier temporarily suspended on a first internal conveyor system 21 which takes the form of an endless chain actively moving one or two carriers, or perhaps more) vertically at any one time. The motion may be continuous or stepped. The means for attachment of carriers to the endless chain is positioned such that one carrier is almost touching the preceding and following carrier while travelling vertically; usually upward which, in combination with a constant shelf height, means that shelves are presented to a loading means at a constant rate. At one end of a tunnel 12 each carrier is pushed, when in alignment, off the endless chain into the tunnel by pushers 24 and 25 that force the frame 29 or 29A of one carrier 30 or 30A to push against the frame of the next carrier as they are carried by wheels 30 on fixed rails 22 through each tunnel, as shown in FIGS. 1 and 4. Usually the carriers are transported upward to the receiving tunnel 12. At the other end of the tunnel each carrier is received on to a second internal conveyor system 21, also an endless chain, which moves the engaged carrier vertically to the entrance of a second or return tunnel 13. At the end of the second tunnel, the carriers are caught and again suspended from the first internal conveyor system 21. According to the invention, stored items are simply pushed off the shelf and on to the outflow conveyor 33 by the same pushing mechanism 36, 37 that is loading the shelf above in the same stroke.

It could be said that items carried on a conveyor are a one-dimensional array; items stacked on a carrier are a two-dimensional array, and a sequence of carriers passing through a tunnel is a three-dimensional array, hence providing the "storage" function as well as a convenient arrangement of items to be heated or frozen within the tunnels. Note that FIG. 2 does not specify a direction of flow of the air. Although the countercurrent direction is generally preferred, some situations require for instance the incoming items to be subjected to the coldest air.

The conveyor system 21 includes upper and lower rails 22 to support the carriers 20, 20A when in horizontal travel along the tunnels 12 (from right to left) and 13 (from left to right), and a chain conveyor 23 including intermittent peg-engagement receptacles within links 32 for lifting and lowering the carriers 20 from one tunnel to the other. The modified links are capable of engaging, carrying and then disengaging from the pegs or lugs 31 on the carriers. The single-loop, dual-chain conveyor 21, 21a might be replaced by two separate dual-chain conveyors, for instance a powered lifting one at the right side of FIG. 1 and a powered dropping one at the left side. The carriers are shunted along the tunnels 12 and 13 by pushers or actuators 24 and 25 which contact the nearest carrier only. Shunting will push the farthest carrier out of the tunnel and into engagement with the chain conveyor 23, as described in more detail below. Preferred pushers are electrically actuated and operate within a few seconds, but the actuators may be driven by other means compatible with engineering principles and food hygiene requirements.

FIG. 3 is a first example of a single carrier; one that does not have a constant shelf height spacing. Each carrier 20 carries multiple items (individual units placed in packages or containers) of the product that shall have a temperature change imposed throughout its period of immersion in the cold air (or hot air as the case may be). At or near the top end, the rack of shelves 26 is attached to a chassis or supporting beam 29, for example comprised of a pair of braced parallel beams. In use inside a tunnel, the chassis 29 of one carrier 20 will bear against the chassis of the preceding carrier to shunt it along the tunnel 12 or 13, and will be shunted in turn by the carrier behind whenever the pushers or actuators 24 or 25 are activated. Each carrier has an upper supporting beam 29 with running wheels 30 on both ends and a peg or detent 31, by means of which the carrier may be lifted or dropped by the chain 32, projects from each end of the chassis between the two bearing wheels 30. Preferably the bearings and the detents are positioned near a top end of the carrier, such that the carrier can hang suspended from the wheels or the detents in use. Additional struts or bracing members 28 maintain the integrity of the construction yet minimise the amount of materials used.

The number and dimensions of the shelves can be varied considerably to suit different products, but preferably the depth of each shelf is sufficient to hold a single product, perhaps 210 mm deep, and the height between shelves is sufficient to allow clearance above the product for airflow. In the example shown in FIG. 1 the carriers are shown with 12 shelves each capable of holding 20 products. A shelf size accommodating 20 packages with short side leading, a single row wide, would be in the order of 4500 mm long×210 mm deep, with for example a distance between shelves of 152 mm. Alternatively, as shown in the embodiment of FIG. 2, the shelves 26 might be about 300 mm apart, and the carriers 20 each have fifteen shelves 26, of a length sufficient to hold fifteen products, with clearance for airflow between them. In the example shown in FIG. 2, each shelf might be about 6.8 meters in length. Other arrangements and configurations might equally be used, depending on the size and nature of the product. As will be appreciated, the detailed configuration of any one carrier may be varied as long as the outer dimensions and support pegs are consistent with the overall dimensions of the tunnel and conveyor. All carriers in any one rack should be the same, unless a loading and unloading system (36, 37 etc) includes means to recognise different configurations of carrier and load each one appropriately.

In one example, where a carrier having 12 shelves each holding 20 products is used, the system requires thirty carriers to allow a continuous cycle of product through the circuit at the required rate to keep up with a line speed of 40 products per minute, allowing 3 hours within the chamber. In practice, one or more additional carriers are installed in the system, to allow for gaps and/or to be used during infeeding and outfeeding by lateral shifting of products between conveyors and respective shelves.

Preferably the support frame includes a robust chassis on which said bearings and detents are mounted and from which said shelves are suspended, said chassis including front and rear bearing surfaces, by which a carrier can bear against and push the preceding carrier.

In FIG. 3A, an improved carrier 20A which does not have an inter-carrier shelf height variation when supported on the endless chain is shown diagrammatically. Only one item, "X", is shown in detail; resembling a foil-sealed ready meal. Unlike the carrier of FIG. 3, carrier 20A does not have a separate upper frame or beam between the support wheels and the uppermost shelf is uncovered. Carrier 20A uses a vertical frame 29A at each side, comprised typically of a corrosion-resistant metal strip having bent edges along its length. A number (for example 12) of individual shelves 26A also made of corrosion-resistant metal strip such as steel, with bent edges along their lengths and welded or otherwise fixed to the vertical frames 29A, support items. The structure is resistant to distortion. The steel is then preferably galvanised or otherwise protected from corrosion in the usual way. A stainless steel version could be used. It will be appreciated that the structure of carrier 30A is simpler than that of carrier 30. For instance no diagonal struts 28 are used.

In FIG. 3A 12 items like "X" are shown on each row, for a total per carrier of 144 items. Another example carrier according to the invention has a shelf length of 5200 mm and a vertical frame length of 3000 mm, supporting 9 shelves each 450 mm deep. Such numbers are given by way of example only; specific requirements may vary.

Combined wheels and chain engagement pegs 30A, 30A serve as rail supports when the carrier is resting or moving along tunnel rails, and as chain engagement means when the carrier is being lifted or lowered at each end of the tunnel. (Separate lifting chain engagement means may be used, as will be known to those skilled in the art. For example, the wheels may be on short shafts and the chain engagement pegs 31 (one on each side) may be separate to the wheels; placed centrally, and may extend beyond the wheels). The wheels could be replaced with skids made of a plastic or a fibre composite such as "Tufnol"® which will slide along the rails 22 of the tunnels. It may be useful to locate the wheels or skids at a height along the vertical frames such that the motion of air in the tunnels does not tend to cause the carrier to tilt by pushing the shelves unevenly. The wheels of carrier 30A are lower down the sides than are the wheels of carrier 30. When in use and being pushed along a tunnel, each carrier pushes against the next over substantially its entire surface.

In use, when the carrier is being shunted along the tunnels 12 or 13 by the pushers or actuators 24 or 25, the bearing wheels 30, 30A roll on the horizontal rails 22 of the tunnel to movably support the carrier 20. When the carrier 20, 20A reaches the end of a pair of rails 22, it is shunted into a position where the projecting detents 30A or 31 come into contact with the chain conveyor 23. This conveyor is operated as a parallel pair of endless chains; one chain at each side. The endless chains may extend the length of the tunnel 21 a or be provided as two paired chains; one pair on each end of each pair of tunnels. The chain conveyor 23 includes "hook" or receptacle attachments 32 comprising specially shaped links in the sprocket chain having openings with concave upper and lower edges capable of engaging with the projecting detents 31 as shown in FIG. 3 or 3A. By this means the carrier 20, 20A is caught and supported by the chain conveyor 23, and can be raised or lowered by it from one tunnel to the other. When the carrier 20, 20A reaches the inward end of the next tunnel to be traversed, the pusher 24 or 25 shunts it off the receptacles 32 and onto the tunnel rails 22, transferring the carrier over a slide until the bearing wheel(s) 30 are located on the rail 22. This transfer clears space for the next carrier 20 to be raised or lowered, and so on. This action occurs at both ends of the system and when the carrier is transferred to the chain 23 from the rail 22, the reverse of the above occurs.

The chain conveyor 23 is preferably driven by one or more motors (not shown) acting on drive wheels, which preferably though not essentially step or jog the conveyor 23 in synchronisation with the pushers 24 and 25, and at a rate determined by the line speed. For a single continuous loop on each side, the weight of the carrier being lifted down is partially balanced by the weight of the carrier being lifted up at the other end of the tunnels.

An opening 35 in the floor 11 admits product carriers being lifted from the loading and unloading station to the upper tunnel 12 through a minimised aperture through baffle 11 so that most of the air is forced through both tunnels. The aperture, and those allowing entry or exit of products through the housing 10 may be further protected against air admittance such as by brushes. The conveyor system 21 moves the carriers 20 in the opposite direction to the flow of air produced by the fans 17, so that the coldest air (coming from the evaporators 18) blows on the coldest product nearing the end of the circuit through the chamber, and the least cold air having passed through all the product in the chamber passes across the warmest product just received. By this countercurrent mode, the air passing across a product in the chamber is always colder than the product itself, assisting refrigeration from beginning to end of the tunnels. The same direction is used if the air is instead heated for products or items to be sterilised or cooked. Some processes require air to be blown in the same direction as that of the items; the non-countercurrent direction, as set by the fans 17 which may be reversible.

Product pushers 36 (for pushing product off a shelf 26 onto the outfeed conveyor 33) and 37 (for pushing incoming new product off the infeed conveyor 34 onto the shelf 26) are used to move the product sideways at a single loading and unloading station, and serve as an interface between the infeed and outfeed conveyors on the one hand, and the internal circulating shelves, on the other hand. Preferably the infeed conveyor will import a set of (in this example) 15 products in a row, which are then pushed sideways in one movement off the conveyor by the pusher 37 onto a shelf 26 of the carrier 20 suspended on the chain conveyor 23 alongside. Similarly and about simultaneously, the coupled pusher 36 will push a whole shelf of frozen products off the carrier 20 and onto the outfeed conveyor 33 at one time. The chain conveyor 23 then steps the carrier 20 upward by the height of one shelf, so the loading and unloading can be performed on the next shelf down. It will be appreciated that many variants in product handling may be entertained. Since the carrier of FIG. 3 has two downward angled structural beams 28, it is preferable that this carrier is loaded so that the product does not collide with the beams—or the beams can be replaced by other designs. This translation and stepping of whole carriers converts serial delivery of products on the infeed conveyor into parallel movements within the apparatus.

In its preferred form, the apparatus of this invention comprises a racking system by which a continuously arriving single stream of product can be handled at the prevailing line speeds. This means that the various transfers such as product load/unload onto or off the racking, shelf (or carrier) elevation or transfer around the chamber shall occur within the time that it takes to fill the infeed conveyor prior to loading on to the racking. Thus with reference to the embodiment of FIG. 1, the stepping action of the chain conveyor 23 (and shunting by the carrier pushers 24 and 25, and other actions of the apparatus) needs to be completed within the time required to assemble another set of 20 products on the infeed conveyor 34, which at a line speed of 40 products per minute allows about 30 seconds.

One design goal of this invention is to provide "continuous" acceptance of product—meaning that the incoming stream of product does not have to be broken into batches or require that the infeed conveyor be halted for periods such as 30 seconds. Therefore the pushers should operate quickly—such as with a cycle time of 3 or 4 seconds. Too fast an operation will require some form of catching means to arrest the faster-moving items. With reference to the embodiment of FIG. 2, the stepping action needs to be completed within the time required to bring in another set of 15 products on the infeed conveyor 34, which at a line speed of 40 products per minute allows about 22.5 seconds. Note that in order to create the required gap in arrival of the product on the infeed conveyor as product is being pushed off it onto the carrier, a stepping or staging infeed conveyor may be used, operating at a speed slightly greater than the overall line speed but with a pause at the required intervals. At 40 units per minute of 200 mm long product plus a gap, the infeed conveyor speed will be 8 to 12 meters per minute, and at 80 units per minute 16 to 24 meters per minute (depending on the length of the gap) which is still not a particularly fast conveyor speed and accordingly not difficult to implement. The apparatus should present an empty shelf to the loading station before the line can fill the infeed conveyor. In the case of 40 units per minute line speed and 20 units per shelf in the chamber, this needs to occur every 30 seconds, and if the line speed is increased to 80 units per minute, then an empty shelf needs to be presented for filling every 15 seconds.

The chain conveyor 26 also moves in an impulse or intermittent way. It moves the carriers 20 up or down by a step which is the distance between one shelf and the next only, or about 152 mm in the embodiment of FIG. 1 or 300 mm in the embodiment of FIG. 2. This part of the cycle takes only 3 to 6 seconds and is completed well within the time required to line up another set of products. Accordingly it has no impact on the cycle time.

Similarly the shelf loading into the rack structure does not impact on the shelf cycle time if the stroke pushing the carrier into the rack structure takes place within the time that it takes to accumulate a shelf-full of product. The return stroke of the pusher does not form a part of the cycle time as it is also a parallel function. The forward stroke of typically 250 mm is executed in about 1 to 4 seconds. The product pushers 36 and 37 push all the products directly, rather than shunting one product with another (and so on), so that no soft product is required to push against another soft product, avoiding damage. In a simple form as shown in FIG. 1, the two pushers 36 and 37 may be joined so as to move together as a single unit, pushing frozen product off one shelf as new product is pushed onto another. By this means, the outfeed rate from the chamber 10 will exactly match the infeed rate.

Alternately as shown in FIG. 2 which is a scaled-up version of the invention, the pushers 36 and 37 may be operated separately, and as shown more than one outfeed pusher 37 could be provided, to discharge product onto more than one outfeed conveyor 33, so that the outfeed operation does not need to be closely synchronised with the infeed operation.

This preferred form of the invention changes sequential movements to a parallel function which has one action period only to be considered in the shelf cycle, of some 3 to 6 seconds. This is made possible by the internal conveyor carrier elevating/lowering mechanisms. This allows the various "out of phase" internal transfers to be made as parallel movements of a lot of product items at one time, as opposed to sequential steps which would result in an extended cycle time. In this way, the system described above can accept a production rate of up to 60/4×20=300 units per minute or 18,000 per hour.

Thus, in a system requiring a three hour freezing time and having an infeed capable of supplying 40 products per minute, sufficient circulating carriers of sufficient capacity are provided to hold at least 7200 (40×60×3) products in use.

Electronic control such as computer control of operations is preferred, to best interface with electric actuators, motor speed controllers, and on the like. The interior of a working blast freezer is very hostile to a human presence so proximity sensors are used to ensure that actuators have moved and that product is in place. Actuator operating currents may indicate that an unexpected load has been found, and confirmation of movements may be provided by microswitches at each end of travel; even a closed-circuit TV camera to better indicate actual or likely problems around the loading or unloading area. Logs of operation, such as records of inlet and outlet tunnel temperatures, will be required.

EXAMPLE 2

It should be noted that it is more convenient to locate the inflow conveyor unloading pushers and the outflow conveyor loading pushers at or about the same part of the apparatus. Although it is desirable and more economical that each rack of shelves nearly completes a loop through a first tunnel than back again a second equal and opposite tunnel while exposed to a countercurrent flow of cooling or heating air, the loop is not essential.

The example of FIG. 2 retains the same overall tunnel layout of FIG. 1, and also has a single countercurrent flow of air. It is a scaled-up version having more shelves and more racks on each shelf, and makes use of two non-linked pushers 36, 36 at the outflow conveyor section, thereby simultaneously unloading products onto two outflow conveyors.

EXAMPLE 3

See FIG. 5, which illustrates an example of a dual-purpose arrangement of two separate pairs of tunnels and includes air diversion means. On the left is shown a 10 tonnes per hour freezer arrangement with a retention time of 8 hours, and on the right a 20 tonnes per hour, 75 min retention time chilling arrangement is shown. Both share a common insulated container 10 and a common refrigerated air supply—fans 17 and evaporator means 18. In this example all product carriers have the same dimensions but could use different dimensions. In one mode of operation the right hand part; 22b and 22b(r) tunnels and enclosed product carriers are used during one part of a 24-hour day to chill a meat product, while the left-hand half; 22a and 22a(r) sections are used simply as cool storage. During another part of the day, the left-hand half; 22a and 22a(r) sections are used as a freezer section while the right-hand section is empty. At this time, the conventional refrigeration means is provided with more power so that the product can be frozen rather than chilled. In order that the air for freezing purposes does not simply bypass the tunnels 22a and 22a(r) containing carriers, a set of air valves has been included. Parts 40a and 40b of FIG. 5 comprise sets of mechanical louvres, here shown in cross section (and in detail in FIG. 6a) which may be rotated in step by an actuator in order to force the cold air through the left-hand tunnels 22a and 22a(r), or be opened at least partially to provide a bypass path past inflow conveyor 34a when in the chilling mode. At the same time part 40c, (see also FIG. 6b) another set of louvers at the far end of the left-hand array of tunnels, may be operated in reverse so as to reinforce the effect of louvers 40a and 40b.

Alternatively, one or two doors may be provided to prevent a flow of air through the aperture used for loading or unloading conveyors from the exterior. Suitable doors comprises a flap, pivoted along one edge and counterweighted and/or loaded with a spring so that there is a bias towards closure. They may be opened by actuators under processor control, or pushed open by passing product carriers.

Variations

Electric internal operation is preferred, for instance there is no risk of leaking hydraulic fluids, but other forms of process control and actuation may be used.

As shown for example by comparisons between FIGS. 1 and 2, the overall size of invention may be scaled up or down in order to meet various demands of throughput and product dimensions, while maintaining the same operating principles. Each product carrier shelf is normally deep enough to hold one item, but may be deep enough to hold more than one item side by side, as well as several items along each shelf.

For added safety a dehumidifier (not shown) is preferably included within the refrigeration system, so that ice does not build up in unwanted places. This may be implemented by means of highly chilled plates in order to trap moisture, and a sequence of ice removal (defrosting) from the plates towards an external vent.

A preferred air flow output temperature from a refrigeration unit may be between +5 deg C. and at least −50 deg C., according to purpose and economics. To run the air supply at a reasonably more extreme temperature and more slowly is more efficient than forcing a large flow of air around the air circuit. For example ten degrees colder air is easier to produce than the equivalent in "freezing power" as a result of movement rate. For applications requiring that products be heated, either a refrigeration unit in reverse, or an air heater may be used to provide temperatures between +5 deg C. and +120 deg C.

Three, or four or more sets of tunnels may be provided within the one insulating housing, so that different kinds of product are each treated to their own combination of time and air flow rate, as previously described in this section. Any extension from two would likely require that there are separate unpacking and packing stations, above or below each other.

INDUSTRIAL APPLICATIONS

The apparatus is suited for use as a "freezing unit" within a production line. Preferably each unit has standardised dimensions. It may be used in food manufacturing processes whether for freezing items in a meat, poultry or fish packing factory, or for freezing pre-prepared meals (such as "TV dinners", airline meals, school meals, and the like)manufactured compositions or components. The apparatus could similarly be applied to a chilling or cooling unit which reduces the temperature of products to a predetermined temperature above freezing. Similarly, the apparatus could be applied to a heating chamber, whether using a heated airflow to heat or dry the products, or passing burners, heaters or other such elements within the circuit defined within the chamber. The apparatus can be used for cold storage.

Advantages

The apparatus is simpler and cheaper to build and run than prior-art equivalents. This concept is reliable and efficient, with reduced freezing operating costs.

The moving parts exposed to the internal environment are not complex.

The air distribution system circulates with minimum losses in the form of bypassed air.

Most air is recycled, reducing the total fan power and as result the required refrigeration load.

Countercurrent air flow allows the product to more certainly approach the temperature of the supplied air.

The apparatus has a compact design for minimised floor space and for minimising heat loss through walls.

Very high production rates are possible with this apparatus, although no part of the machine runs at a high speed The apparatus maintains the orientation of the product between the inflow and the outflow conveyors. That facilitates easy integration with downstream automation by maintaining product orientation.

Finally, it will be understood that the scope of this invention as described and/or illustrated herein is not limited to the specified embodiments described. Those of skill will appreciate that various modifications, additions, known equivalents, and substitutions are possible without departing from the scope of the invention as set forth in the following claims.

I claim:

1. A continuous, recirculating storage apparatus that transports items through a housing (10) enclosing a controlled environment, the storage apparatus comprising:
   first substantially horizontal tunnel (12) inside the housing (10);
   a second substantially horizontal tunnel (13) inside the housing (10); and
   at least one internal transport conveyor system (34) inside the housing (10), each internal transport conveyor system being occupied, in operation, by a plurality of internal recirculating carriers (20A), and each internal transport conveyor system configured as a closed loop having, in reversible sequence, a first vertical transport means (21) and a second vertical transport means, wherein the first vertical transport means (21) operably lifts carriers past a loading and unloading station, and terminates at the first tunnel (12), the first tunnel (22) provided with a first set of rails (22) that operably supports and conveys each suspended carrier of a stacked array of carriers off of the first vertical transport means (21), each carrier maintained in contact with adjacent carriers within the first tunnel (12), the first tunnel (12) terminating at the second vertical transport means, wherein the second vertical transport means operably receives each carrier from the first set of rails (22) of the first tunnel (12) and lowers the carriers to the second tunnel (13), the second tunnel (13) having a second set of rails (22) and terminating at the first vertical transport means (21), each carrier having a consistent height and thickness and width, and disposed either
(a) as a stack of carriers in contact with adjacent carriers, suspended from the rails of either the first or the second tunnel (12, 13), or
(b) held in end-to-end orientation with respect to adjacent carriers upon the vertical transport means (20) when traversing the loading and unloading station, each carrier having a plurality of transverse horizontal shelves (26) each having a length and a consistent inter-shelf spacing, a spacing maintained between one carrier and an adjacent carrier located vertically above or below said one carrier when both carriers are traversing the loading and unloading station being so that, in operation, the apparatus receives a continuous and uninterrupted flow of items from an inflow conveyor.

2. The apparatus as claimed in claim 1, wherein the loading and unloading station includes an inflow conveyor (34), disposed beside and along the length of any one shelf (26) of a carrier (20A) and between the shelf and a product pusher (37) having a first pushing surface nearly as wide as the length of the shelf.

3. The apparatus as claimed in claim 2, wherein motion of the vertical transport means (21) is controlled, in operation, in step with actuation of the product pusher (37) such that each push of the product pusher loads one of a vertical series of shelves of the plurality of carriers with sequentially carried items from the inflow conveyor (34) at the loading and unloading station, thereby permitting uninterrupted unloading of the incoming conveyor.

4. The apparatus as claimed in claim 3, wherein the loading and unloading station further includes the second or outflow conveyor disposed beside and along the length of any one shelf (26) of a carrier (20A), and at a lower height, relative to the inflow conveyor (34) and equal to one or more inter-shelf spacings of the carrier (20), than that of the product pusher (37) and at a side opposite to a position of a product pusher (36).

5. The apparatus as claimed in claim 4, wherein two product pushers (37, 36) are coupled together and are extended and retracted at the same time such that, in operation, one push causes the lower, loaded shelf to be cleared of items after storage for a retention time to the second or outflow conveyor (37), and causes the upper, unloaded shelf to be loaded with items to be stored from the inflow conveyor (34).

6. The apparatus as claimed in claim 5, wherein a single product pusher (37) includes a second pushing surface (36) vertically spaced apart from and connected to the first pushing surface.

7. The apparatus as claimed in claim 1, wherein the internal transport conveyor system includes a first carrier actuator (24) that operably pushes an adjacent carrier supported by the first vertical transport means sideways and off the first vertical transport means and into the first tunnel, thereby pushing a carrier at a far end of the tunnel out of the tunnel to be picked up by the adjacent second vertical transport means, and a second carrier actuator (25) that operably pushes an adjacent, loaded carrier sideways off the second vertical transport means and into the second tunnel such to cause a carrier at the far end of the tunnel to emerge from the tunnel and be picked up by the adjacent first vertical transport means.

8. The apparatus as claimed in claim 1, wherein the controlled environment comprises recirculated air having an actively controlled temperature that is forced through the second tunnel and then the first tunnel in a direction opposite to that of movement of the carriers in order to cause a change of state of the items on the shelves of the carriers during the retention time, the change of state being selected from the group consisting of: sterilizing, cooking, chilling and freezing.

9. The apparatus as claimed in claim 1, wherein the controlled environment comprises recirculated air having an actively controlled temperature that is forced through the first tunnel and then the second tunnel in a direction the same as that of movement of the carriers, thereby causing a change of state of the items on the shelves of the carriers during the retention time; the change of state being selected from a range including sterilizing, cooking, chilling and freezing.

10. The apparatus as claimed in claim 1, wherein the apparatus includes a plurality of separate internal transport conveyor systems, each configured as a separate closed loop within the housing (10) of the apparatus.

11. The apparatus as claimed in claim 10, wherein the separate closed loops each define recirculation paths of different lengths thereby providing different retention times.

12. The apparatus as claimed in claim 11, wherein the separate closed loops are when in use operated at different controlled velocities, thereby providing different retention times.

13. The apparatus as claimed in claim 11, wherein air control means (40a, 40b, 40c) are provided that, in operation, selectively diverts flow of air into at least one of said recirculation paths, thereby providing control over temperature change within items in the recirculation paths.

14. The apparatus as claimed in claim 1, wherein the inflow conveyor and the outflow conveyor are the same conveyor.

15. A recirculating storage apparatus having an enclosed housing (10), wherein one or more items received from a first or incoming item transport means or conveyor (34) are held in an internal transport conveyor having a closed loop configuration providing for a retention time within a controlled environment, and then are transferred to a second or outgoing item transport means or conveyor (33), comprising:
a plurality of internal recirculating carriers (20A) occupying the internal transport conveyor, each carrier having a vertical series of horizontal shelves (26, 26A) each having a length, and wherein the input conveyor (34) has a direction of movement aligned along the length of the shelves so that each shelf can be loaded at a loading station from a series of transported items by one pushing motion of an actuator (37) having a pushing surface nearly as wide as the length of any shelf, wherein the output conveyor has a direction of movement aligned along the length of the shelves so that each shelf (26, 26A) can be unloaded on to at least one conveyor (33) at an unloading station by one pushing motion of an actuator (36), the loading and the unloading stations being adjacent, wherein the closed loop configuration of the internal transport conveyor includes a first vertical transfer means traversing the loading station and the unloading station at which the shelves of the carrier are unloaded and re-loaded, a first carrier actuator (24) capable when activated of pushing an adjacent, loaded carrier sideways into and so capable of pushing a stack of like carriers through a first substantially horizontal tunnel (12), then a second vertical transfer means (21), then a second carrier actuator (25) capable when activated of pushing an adjacent carrier sideways into, and so capable of pushing a stack of like carriers through a second substantially horizontal tunnel (13) and back to the first vertical transfer means (21) thereby causing the stack of carriers to traverse the tunnels at a controlled average velocity and thereby controlling the retention time within the controlled environment, wherein the width and height of any one carrier is less than a width and a height of each tunnel, and wherein a controlled environment comprising recirculated air having an actively controlled temperature is forced through the second tunnel and then the first tunnel in a direction opposite to that of movement of the carriers, thereby optimizing contact of items on shelves of carrier with the air in order to cause a change of state of the items during the retention time, the change being selected from a range including sterilizing, cooking, chilling and freezing, and wherein the recirculated air is forced through the first tunnel and then the second tunnel in the same direction as that of the carriers, thereby optimizing contact of items on shelves of carrier with the air in order to cause a change of state of the items during the retention time, the change being selected from a range including sterilizing, cooking, chilling and freezing.

* * * * *